United States Patent [19]
Laws

[11] Patent Number: 6,018,494
[45] Date of Patent: Jan. 25, 2000

[54] SIGNATURE ESTIMATION OF A SEISMIC SOURCE

[75] Inventor: Robert Laws, Cambridge, United Kingdom

[73] Assignee: Schlumberger Technology Corporation, Sugar Land, Tex.

[21] Appl. No.: 09/120,602

[22] Filed: Jul. 22, 1998

[30] Foreign Application Priority Data

Aug. 7, 1997 [GB] United Kingdom ................... 9716628

[51] Int. Cl.[7] .................................................. G01V 1/38
[52] U.S. Cl. ............................... 367/23; 367/20; 181/110
[58] Field of Search ................................. 367/19, 21, 41, 367/23, 20, 15; 181/111, 110

[56] References Cited

U.S. PATENT DOCUMENTS

| | | | |
|---|---|---|---|
| 4,476,550 | 10/1984 | Ziolkowski et al. | 367/21 |
| 4,644,507 | 2/1987 | Ziolkowski | 367/23 |
| 4,648,080 | 3/1987 | Hargreaves | 367/20 |
| 4,658,384 | 4/1987 | Dragoset, Jr. et al. | 367/23 |
| 4,693,336 | 9/1987 | Newman | 181/111 |
| 4,908,801 | 3/1990 | Bell et al. | 367/23 |

FOREIGN PATENT DOCUMENTS

| | | | |
|---|---|---|---|
| 0 066 423 | 1/1988 | European Pat. Off. | G01V 1/02 |
| 0 555 148 | 6/1996 | European Pat. Off. | G01V 1/02 |

OTHER PUBLICATIONS

M. Landro and R. Sollie, Geophysics 57, 1633–1644.
Enders A. Robinson, *Physical Applications of Stationary Time–Series*, Griffin, 1980, Section 7.8.

*Primary Examiner*—Christine K. Oda
*Assistant Examiner*—Anthony Jolly
*Attorney, Agent, or Firm*—William L. Wang; Keith G. W. Smith; William B. Batzer

[57] ABSTRACT

A marine seismic survey is described which uses measurements made in a mid-field region of the source signature to correct an estimate of the far-field source signature as derived from individual contributions of the seismic source elements. The technique reduces the effects of perturbations which else have a considerable impact on the estimation of the far-field.

19 Claims, 1 Drawing Sheet

SIGNATURE ESTIMATION OF A SEISMIC SOURCE

The present invention relates to methods for estimating the signature of a seismic source. More specifically, it pertains to such methods for estimating the signature, preferably the far-field signature, of a source comprising a plurality of source elements from the individual contribution of each element.

BACKGROUND OF THE INVENTION

As is well known in the art of marine seismic surveying, a sound source is towed behind a ship beneath the surface of a body of water. The sound may be generated by a small explosive charge, an electric spark or arc, a vibrator or, usually, an array of several air guns. The air gun array is towed about 6 to 10 meters beneath the sea surface. The air guns each contain a volume of air compressed to high pressure. Upon command, the guns abruptly release their volumes of compressed air to create a sound wave in the water. The resulting pressure wavefield propagates downwardly, into the earth beneath the sea floor, to the sub-bottom strata, whence the wavefield is reflected back up towards the water surface. The reflected wavefield is detected by a hydrophone array that is towed behind the ship just beneath the water surface. The hydrophone array may extend three thousand meters or more behind the ship and may include up to several thousand hydrophones. The detected reflected wavefields are recorded on time-scale recordings or seismograms.

When the seismic source is triggered or fired, it produces a complex output pressure pulse. Typically, the pulse consists of a short, initial, fast positive rise in amplitude, followed by several rapidlydecaying oscillations. The wavetrain might be 150 to 500 milliseconds (ms) long and is termed the "signature" of the sound source. The wavefield generated by the sound source radiates in all directions and the pulse shape generally varies with distance and direction.

The far field can be defined as that distance from the source at which the amplitude ratio between ghost, i.e. reflection of the wavefield from the water/air interface, and the direct wavefield equals or exceeds 0.95. Another way of defining the far-field is by looking at the distance at which the pressure pulse of the source may without great error be regarded as stemming form an ideal source unchanging with distance in any given direction. Thus, generally the pressure pulse can be represented as a function of position (in polar co-ordinates) and time, i.e. $p(r,\theta,\phi,t)$. If the distance, r, is sufficiently large as compared to the characteristic length D, typically the length of the (linear) array, this may be simplified to a far-field approximation in which the dependence on the distance, r, takes a particularly simple form: $p(r,\theta,\phi,t)=S(\theta,\phi,t-r/c)/r$.

The salient feature of this far-field approximation is that if r is varied while the polar angles $\theta$ and $\phi$ are held constant, the shape of the pressure pulse does not change except in amplitude (as 1/r) and arrival time (delay t/c). Typically the far-field region is considered to begin when this approximation shows an error of about 5%. For all practical purposes, the far-field is considered to exist at distances in excess of 250–300 meters from the source. Under less stringent conditions, the far-field may be allowed to start at about 100 meters from the source.

The far-field signature is either measured by hydrophones located in an appropriate distance from the source or, more conveniently extrapolated from near-field experiments.

In the near-field region, the distances between single elements of the source are of the same order as the distance to the (near-field) receiver. Each receiver must be placed within a distance D from the source array, where D is equal to the largest linear dimension (characteristic length) of the array itself (including the images in the sea surface).Hence, for a marine seismic array that is 15 meters long and 6 meters deep under the surface, the near-field region extends to a depth of about 21 meters.

One method of extrapolating the far-field from the near-field is taught by the U.S. Pat. No. 4,658,384. Another reference of interest is U.S. Pat. No. 4,648,080, issued 03103'87 to N. D. Hargeaves. Other references of interest are U.S. Pat. No. 4,644,507 issued to A. M. Ziolkowski.

In U.S. Pat. No. 4,658,384 the far-field pressure signature of an air-gun array is derived from near-field measurements. An array of air guns is deployed in the water at a desired depth. A hydrophone is suspended in the middle of the array at the same depth so that the guns are equidistant from the hydrophone. The lateral spacing between the guns and the sensor is much less than the water depth of the guns. Having fired the guns, the ghost reflection amplitude in the near field will be much less than the amplitude of the direct arrivals and can be ignored. The far-field signature is determined by inverting the observed pressure signature, delaying it in proportion to array depth and adding the inverted, delayed signature back to the original signature.

In U.S. Pat. No. 4,693,336 a second "calibration" source is fired immediately before the main source. Using the recordings of both sources, the far-field of the main source can be calculated.

Of particular interest are European Patent Application EP-A-0,066,423, which describes an example of air gun array with signature measurement, U.S. Pat. No. 4,908,801 and European Patent Application EP-A-0,555,148.

In U.S. Pat. No. 4,908,801, use is made of a library of stored near-filed source signatures for individual air guns. During the survey, time, position and other environmental parameters are measured for each source and the composite far-field signature of the array is then determined by combining the measured parameters with the individual source signatures as stored in the library.

Use of pre-recorded data is also described in the European Patent Application EP-A-0,555,148, where the far-field signature of an array is recorded by a far-field hydrophone prior to the seismic survey. A transfer function is derived from the pre-recorded data so that the far-field signature can be estimated during the survey using near-field signature alone.

In view of the above cited references, it is seen as an object of this invention to provide methods and apparatus for estimating the signature of a plurality of seismic. More specifically, it is an object of the invention to provide such methods and apparatus to enable real-time estimation of the far-field signature of an seismic source array, particularly where a direct far-field measurement is not possible.

SUMMARY OF THE INVENTION

It is observed that the known methods and apparatus for estimating or extrapolating the signature of a seismic source can be improved by placing receiver means in an area which lies between the near-field and the far-field of the acoustic wave. For the purpose of the present invention, this area is defined as "mid-field". In terms of distance from the source, the lower boundary of the mid-field region can be defined as a sphere of 10 meters, preferably 25 m radius around the source. The mid-field domain terminates with the onset of the far-field region, i.e. approximately in a distance of 200 meters, preferably 100 meters, more preferably 50 meters from the source. It should be noted that the mid-field measurement does not directly provide a far-field signature suitable for seismic data processing. In the mid-field region, the distances between single elements of the source are small but still significant compared with the distance to the mid-field receiver.

Seismic measurements within the scope of the invention are typically performed in a body of water with a exploration vessel towing a seismic source consisting of a plurality of source elements. Those source elements can be air guns, water guns, vapor based guns (e.g. Vaporchoc) or Starjets or any other pressure pulse generating means. The source can be arranged as array, cluster or a combination, thereof.

The seismic signal is detected using a plurality of seismic receiver means, usually conventional hydrophone streamers. However, it is within the scope of the present invention to employ other receivers, such as hydrophones based on optical pressure sensors, or in cases where the signal is detected by sensors deployed at the sea bottom or in subsea wells, the receiver means may also include geophones or accelerometers.

The mid-field receiver to perform the mid-field measurements is one or a plurality of sensors sensitive to pressure, preferably hydrophones using piezo-electric, optical, or micro-machined silicon pressure sensors. The measurement can be made using one single sensor or a plurality of sensors deployed in the mid-field region.

In order to derive from the mid-field measurements the source signature at any position, the invention further uses the individual contribution of each source element. Those individual contributions, also known as "notional sources" in the relevant literature, are usually derived from near-field measurements, typically performed by hydrophones placed in the immediate vicinity of the source as described for example in the above cited European Patent Application EP-A-0,066,423. Other known methods to measure the individual contribution of the source elements include the use of so-called "mini-streamers" located within or close to the near-field region of the source, as described for example by M. Landro and R. Sollie in: Geophysics 57, 1633–1644. However, instead of using near-field measurements, the individual contributions may be estimated from pre-recorded data, perhaps modified by appropriate measurements of other environmental parameters, e.g. temperature or hydrostatic pressure.

With a known notional source and applying known algorithms, an estimate of the far-field can be calculated. In the past, the thus estimated far-field has not always been proven reliable as the source is subject to various perturbations such as uncertainties in the exact geometrical layout of the source array, uncertainties in the positions and gains of the near-field hydrophones, or the non-flatness of the sea surface (from which part of the wavefield is reflected).

The mid-field can be advantageously used to correct the flawed far-field estimate as derived through the near-field measurement or any other method. In a particular aspect of the invention, the mid-field measurement is compared to a mid-field estimate derived from the near-field measurement using essentially the same algorithms as used for the far-field estimation. The comparison can then be used to define a correction filter. Even though the correction filter is defined to correct mid-field estimates, it is observed that the differences between the mid-field correction and the (unknown) far-field correction are not significant and, hence, the mid-field correction filter can be applied directly to the far-field estimate to yield a more accurate far-field signature.

It should be noted that the present invention is not restricted to improving the estimation of the far-field, but can be extended to any position of the wavefield.

The improved signature can in subsequent steps be used in the further processing, such as de-convolution, of the acquired seismic data to gain information about subterranean formations.

It should also be noted that the methods and apparatus in accordance with the invention can be used to calculate the (far-field) signature during a seismic acquisition and furthermore on a shot-by-shot basis. The results include a correction for dynamic perturbations such as distortion of the source array and a non-flat sea surface.

These and other features of the invention, preferred embodiments and variants thereof, and further advantages of the invention will become appreciated and understood by those skilled in the art from the detailed description and drawings below.

MODE(S) FOR CARRYING OUT THE INVENTION

Figure 1:
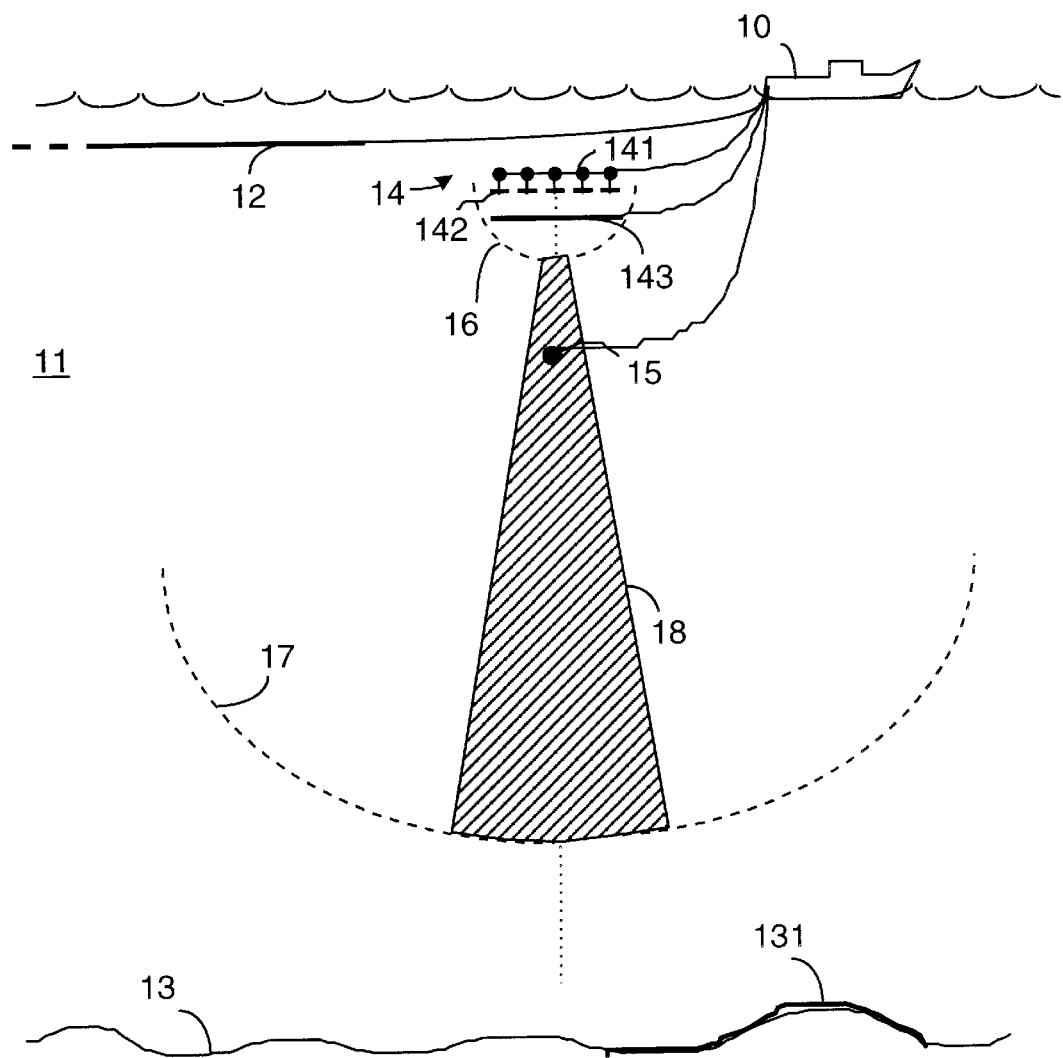
FIG. 1 schematically illustrates the location of a mid-field receiver in accordance with the present invention.

Referring to FIG. 1, it is illustrated how the mid-field measurement in accordance with the invention relates to known methods and devices.

A typical marine seismic survey equipment includes a seismic exploration vessel 10, which tows in a body of water 11 one or a spread of seismic streamers 12. The length of the streamers may vary from several hundreds to more than thousand meters. A streamer comprises a large number of hydrophones (not shown) to gather sonic energy reflected by the sea bottom 13 and the formations below. For other type of surveys, the streamers may be replaced or used in combination with sea-bottom cables 131 or other receiver arrays.

Also towed by the exploration vessel are seismic sources 14, typically one or more arrays of air guns elements 141 whereby each element 141 consists of one or a cluster of single air guns. The air guns used of this example may be replaced by any other type of pressure pulse source. The air guns 141 are each equipped with an additional near-field hydrophone 142 to measure the near-field source signature. An alternative method for measure the near-field source signature is indicated by a mini-streamer 143, deployed in or near the near-field of the source array 14. It is important for the scope of the present invention to stress that both, near-field hydrophones and mini-streamers are alternative concepts to determine the same thing, namely the contribution of the individual elements of the array, from which the far-field signature can than be calculated.

So far, reference has been made to existing methods and apparatus. The invention however is characterized by placing receiver means 15 in the mid-field region of the wavefield as generated by the source array 14. This mid-field region is indicated by two dashed semi-circles 16, 17 with the array at their center. Though not drawn to scale, the semi-circles of this example indicate a distance from the center of 20 meters and 100 meters, respectively. The receiver 15, which in the present example is a single hydrophone towed together with the source array 14, is deployed at a depth of 25 meters below the center of the source array. For most applications, the receiver 15 should remain within a solid angle of 15 degrees from the vertical as indicated by the hatched area 18. However, for determining the far-field at wide angles, it may be advantageous to place the receiver at wider angles, e.g. 30 degrees, or use a plurality of receivers.

In the following, there is described an outline of steps to derive a correction filter for the far-field estimation in accordance with an example of the invention.

To focus the description on the novel elements, it is assumed that the individual contributions $S_i(t)$ for all source elements of the source array have been measured or calculated following methods as described for example in the above cited European Patent Application EP-A-0,066,423, or alternatively by M. Landro and R. Sollie in: Geophysics 57, 1633–1644.

The mid-field signature is then estimated directly from the element contribution $S_i(t)$ without using the mid-field measurement:

$$P_{me}(t) = \sum_i \left[ \frac{S_i(t - r_{smi}/c)}{r_{smi}} + R_{ref} \frac{S_i(t - r_{gmi}/c)}{r_{gmi}} \right] \quad (1)$$

where c denotes the speed of sound in water, $r_{smi}$ the distance of the ith element in the source array from the mid-field hydrophone, and $r_{gmi}$ the distance of the ith ghost (image in the nominally flat sea surface) from the mid-field hydrophone. $R_{ref}$ is the nominal flat-sea reflection coefficient (−1), which may vary depending for example on the roughness of the sea surface. As a result of the summation over all source elements i, a pressure function $P_{me}(t)$ at the mid-field position is estimated.

Then a correction filter is designed that removes the error in the estimated mid-field signature $$F(t) * P_{me}(t) = P_{mm}(t) \quad (2)$$

where $F(t)$ is the filter to be determined, "*" denotes convolution, $P_{me}(t)$ is the estimated signature from the previous step, and $P_{mm}(t)$ is the measured signature by the mid-field hydrophone.

The solution of this equation for $F(t)$ can, for example, be determined using the Levinson algorithm (as described in textbooks related to this subject. See for example Enders A. Robinson: "Physical Applications of Stationary Time-Series", Griffin, 1980, Section 7.8.

The far field estimate can be computed from the individual source elements according to $$P_{fe}(t) = \sum_i \left[ \frac{S_i(t - r_{sfi}/c)}{r_{sfi}} + R_{ref} \frac{S_i(t - r_{gfi}/c)}{r_{gfi}} \right] \quad (3)$$

where $P_{fe}(t)$ is the estimated pressure at the far-field position, $r_{sfi}$ is the distance of the ith element in the array from the far-field position, and $r_{gfi}$ is the distance of the ith ghost (image in the nominally flat sea surface) from the far-field position.

The corrected far field signature is determined by applying (by convolution) the correction filter $F(t)$ (as determined above) to the estimated far field signature, i.e.

$$P_{fc}(t) = P_{fe}(t) * F(t) \quad (4)$$

where $P_{fc}(t)$ is the corrected far field signature.

I claim:

1. (amended) A seismic survey, comprising the steps of:
   towing through a body of water at least one seismic source array comprising a plurality of source elements;
   activating said at least one source array to generate acoustic wave signals;
   measuring energy from the at least one source array using one or more near-field receivers located in a near-field region with respect to the at least one source array;
   towing simultaneously with said at least one source array a mid-field receiver located in a mid-field region with respect to the at least one source array;
   measuring energy from the at least one source array;
   measuring acoustic waves having traveled through subterranean formations using seismic receivers; and
   estimating a far-field signature associated with said at least one seismic source array using the measurements made by said one or more near-field receivers and the measurements made by said mid-field receiver.

2. The seismic survey according to claim 1, wherein the mid-field receiver is deployed in a depth range of 10 to 200 meters below the at least one source array.

3. The seismic survey according to claim 2, wherein the mid-field receiver is deployed in range of 0 to 30 degrees away from a vertical line through the at least one source array.

4. The seismic survey according to claim 1, wherein the mid-field receiver comprises one or more hydrophones.

5. Method for estimating the signature of a seismic source array comprising the steps of:
   towing in a body of water at least one seismic source comprising a plurality of source elements;
   determining an individual contribution for each of said source elements using measurements made by one or more near-field receivers located in a near-field region with respect to the at least one source;
   deriving an estimate of the source signature in a mid-field region from said individual contributions;
   towing simultaneously with said at least one source a mid-field receiver deployed in said mid-field region with respect to the at least one source to measure the source signature in said mid-field region;
   comparing said estimated and said measured source signature in said mid-field region to determine a correction; and
   using said correction when deriving an estimate of the source signature from said individual contributions.

6. The method of claim 5, wherein the estimated signature is a far-field signature.

7. The method according to claim 5, further comprising the steps of recording seismic signals, transferring said signals to a data processing unit, processing said signals to generate a representation of a subterranean region using the corrected far-field source signature.

8. A method of processing seismic data, wherein said data have been recorded using a modified signature of a seismic source array estimated by
   towing in a body of water at least one seismic source comprising a plurality of source elements;
   measuring energy from the at least one seimic source using one or more near-field receivers located in a near-field region with respect to the at least one seismic source;
   determining an individual contribution for each of said source elements using the measurements made with the one or more near-field receivers;

deriving an estimate of the source signature in a mid-field region from said individual contributions;

towing simultaneously with said at least one source a mid-field receiver deployed in said mid-field region with respect to said at least one source;

measuring the source signature in said mid-field region using the mid-field receiver;

comparing said estimated and said measured source signature in said mid-field region to determine a correction; and using said correction when deriving an estimate of the source signature from said individual contributions.

9. The seismic survey according to claim 2 wherein the one or more near-field receivers a capable of determining an individual contribution of each of said plurality of source elements.

10. The seismic survey according to claim 9 wherein the mid-field receiver measures a mid-field source signature of said seismic source array.

11. The seismic survey according to claim 10 wherein the mid-field receiver is deployed in a depth range of 25 to 200 meters below the at least one the source array.

12. The seismic survey according to claim 1 wherein the mid-field receiver is deployed in a depth range of 25 to 100 meters below the at least one the source array.

13. The seismic survey according to claim 3 wherein the mid-field receiver is deployed in a depth range of 25 to 50 meters below the at least one the source array.

14. The seismic survey according to claim 3 wherein the mid-field receiver is deployed in range of 0 to 15 degrees away from a vertical line through the at least one source array.

15. The seismic survey according to claim 1 wherein the step of estimating a far-field signature includes correcting for dynamic perturbations due to a non-flat sea surface.

16. The seismic survey according to claim 1 wherein said one or more near-field receivers are near-field hydrophones included in the at least one source array.

17. The seismic survey according to claim 1 wherein said one or more near-field receivers comprise a ministreamer.

18. The seismic survey according to claim 1 wherein said seismic receivers are seismic streamers comprising a plurality of hyrophones towed simultaneously with said at least one source.

19. The seismic survey according to claim 1 wherein said seismic receivers comprise at least one see-bottom cable.

* * * * *